(12) United States Patent
Bundy

(10) Patent No.: US 9,308,640 B2
(45) Date of Patent: Apr. 12, 2016

(54) TEMPLATE FOR MARKING CONVEYOR BELT SPLICES

(71) Applicant: Fenner Dunlop Americas, Inc., Pittsburgh, PA (US)

(72) Inventor: Bradley W. Bundy, Lavonia, GA (US)

(73) Assignee: Fenner Dunlop Americas, Inc., Pittsburgh, PA (US)

( * ) Notice: Subject to any disclaimer, the term of this patent is extended or adjusted under 35 U.S.C. 154(b) by 270 days.

(21) Appl. No.: 14/182,835

(22) Filed: Feb. 18, 2014

(65) Prior Publication Data

US 2014/0230260 A1    Aug. 21, 2014

Related U.S. Application Data

(60) Provisional application No. 61/766,004, filed on Feb. 18, 2013.

(51) Int. Cl.
| | | |
|---|---|---|
| *G01B 3/02* | (2006.01) | |
| *B25H 7/02* | (2006.01) | |
| *G01B 3/14* | (2006.01) | |

(52) U.S. Cl.
CPC .. *B25H 7/02* (2013.01); *G01B 3/02* (2013.01); *G01B 3/14* (2013.01)

(58) Field of Classification Search
CPC .................................... B25H 7/02; G01B 3/02
USPC .................................................... 33/494, 562
See application file for complete search history.

(56) References Cited

U.S. PATENT DOCUMENTS

| | | | | |
|---|---|---|---|---|
| 1,729,523 | A * | 9/1929 | Schweimler | G01B 3/02 33/664 |
| 5,251,382 | A * | 10/1993 | Hellar | G01B 3/1082 33/487 |
| 5,487,223 | A * | 1/1996 | Krane | G01B 3/004 33/483 |
| 6,510,617 | B1 * | 1/2003 | Gerdes | H03M 1/287 33/484 |
| 7,415,772 | B1 * | 8/2008 | Ferretti | G01B 3/04 33/491 |
| 8,720,077 | B1 * | 5/2014 | Fallisgaard | G01B 3/1002 33/759 |
| 2006/0090360 | A1 * | 5/2006 | Shapiro | G01B 3/04 33/473 |
| 2008/0209749 | A1 * | 9/2008 | Chua | E04G 21/1891 33/758 |
| 2009/0083984 | A1 * | 4/2009 | Platt | B26B 29/06 33/492 |
| 2009/0165316 | A1 * | 7/2009 | Chen | B43L 7/00 33/494 |
| 2012/0227275 | A1 * | 9/2012 | Goldrick | E04F 21/26 33/562 |
| 2014/0230260 | A1 * | 8/2014 | Bundy | B25H 7/02 33/494 |

* cited by examiner

*Primary Examiner* — Yaritza Guadalupe-McCall
(74) *Attorney, Agent, or Firm* — Shumaker, Loop & Kendrick, LLP

(57) ABSTRACT

An apparatus for marking conveyor belt ends to be bias angle finger spliced including a first rigid body marked with indicia including a centerline marking for alignment with a conveyor belt centerline and equally spaced measurement indicia marked outward from the centerline marking corresponding, respectively, to conveyor belt finger base points and a second rigid body marked with a centerline marking and equally spaced measurement indicia marked outward from the centerline marking corresponding, respectively, to conveyor belt fingertip points, wherein the measurement indicia between the first and second bodies is offset by half a spacing measurement from the centerline marking outward to differentiate the first and second bodies.

14 Claims, 2 Drawing Sheets

TEMPLATE FOR MARKING CONVEYOR BELT SPLICES

CROSS-REFERENCE TO RELATED APPLICATION

This application claims priority to U.S. Provisional Application No. 61/766,004 filed Feb. 18, 2013, the entirety of which is incorporated by reference herein.

TECHNICAL FIELD AND BACKGROUND OF THE INVENTION

The present invention relates generally to the field of apparatus and methods for conveyor belt splice repair, and more particularly, to apparatus configured to mark the ends of a conveyor belt to be spliced along a bias angle by way of a multi-finger splice procedure.

Numerous types of conveyor belt splicing and repair methods are known. When belts come apart or tear in the field, skilled belt splicers are called upon to artfully cut the ends of the belt and rejoin them in the strongest manner possible. The belt splicing methods employed are typically decided based upon the material from which the belt is made, e.g., vulcanized rubber, elastomers, fabrics, as well as the demands of the application. Belt splices and reconnections may be "square," i.e., perpendicular to the long axis of the belt, or "bias," which deviates obliquely from square.

Biased vulcanized splices are most common. This is because bias vulcanized splices are resilient and outperform square splices in nearly every application. Also, studies show that a belt splice angled obliquely to the belt's long axis is able to more effectively displace torsional as well as both lateral and axial forces applied to the belt at the splice during operation. A bias splice is stronger and, therefore, more preferable than a square one. A bias splice is more difficult, however, since the splice is angled across the belt width while the cut splicing portions of the belt must remain parallel to the belt's long axis.

When measuring a belt straight across the width (square splice), the finger base and fingertip points, reference points which when marked onto the belt and connected delineate the splice cut lines, fall more or less uniformly across the belt. For the bias splice, however, fractions have to be calculated outwardly from the centerline of the belt so that the splicing portions of the belt maintain proper width when measured perpendicular to the long axis of the belt, which makes the mending of the belt uniform. Besides having to make arithmetic calculations in one's head, using a tape measure for this purpose is cumbersome and requires special dexterity while manipulating other hand tools. Errors too frequently occur as a result. Thus, numerous devices have been created and developed to aid in delineating splice lines, to free up hands, and to eliminate use of the tape measure. Each, however, has its shortcomings.

One such device utilizes chalk covered strings, e.g., chalk lines, stretched across a four-sided adjustable frame. The strings are attached at opposite ends of the frame so they can be individually raised until taught and released so as to snap down against the belt, which lies underneath the frame. Chalk deposited from the string forms a line on the surface of the belt. Clearly, chalk lines are replete with obvious problems, some of which include dirty wet conditions washing off the chalk, string breakage, messy chalk and faint undetectable lines.

Another prior art device includes a stencil in the shape of a parallelogram. Cutouts through the stencil correspond to finger base and fingertip points and positions as well as lines that connect the same when the stencil is moved into proper alignment. Once in position, operators apply spray paint or other marker through the cutouts, which makes the subject splicing delineations visible on the underlying conveyor belt. The paint tends to run and lines tend to clog, however, leaving inconsistent lines and requiring routine cleaning. Further, metal stencils are expensive, heavy to maneuver and have sharp edges that can cause personal injury and other damage when handled. Another problem is that each stencil is specific, and therefore limited to the measurements of its cutouts. Multiple stencils are therefore necessary for each belt specification, of which there are many. There is no universal stencil device.

Thus, it would be advantageous to provide an improved apparatus for accurately and conveniently marking conveyor belt splices. It would be advantageous if such a device was capable of eliminating the shortcomings identified above and could be used in any bias belt splicing procedure.

BRIEF SUMMARY OF THE INVENTION

In a first embodiment, an apparatus for marking conveyor belt ends for bias angle splicing, e.g., multi-finger splicing, is provided herein and generally includes first and second flat, elongate rigid bodies marked with relevant measurement indicia for splicing. Each of the first and second rigid bodies has two ends, first and second lateral edges extending between and connecting the ends, a bottom surface, and a top surface marked with indicia. The top surface of the first rigid body is marked with equally spaced indicia, each of which corresponds, respectively, to a conveyor belt finger base point. The top surface of the second rigid body is marked with equally spaced indicia, each of which corresponds, respectively, to a conveyor belt fingertip point.

In a further embodiment, the indicia on the first and second rigid bodies includes a centerline "CL" mark, the centerline being a line drawn in the middle of the belt (parallel to belt travel) used to align one belt end with another. In one aspect, the sets of indicia between the first and second rigid bodies may be offset, respectively, by half of a spacing measurement taken from the centerline mark of each of the respective bodies outward, thereby differentiating the first rigid body from the second rigid body.

In a further embodiment, the measurement indicia on the first and second rigid bodies may be equally spaced, however, where the indicia fall with respect to the centerline of each of the first and second bodies may be different, e.g., offset, such that the first rigid body is differentiated from the second rigid body. For example, the centerline of the first rigid body may fall halfway between finger base point markings on the first rigid body, while the centerline of the second rigid body may fall on a fingertip point marking such that, when the centerlines of the first and second rigid bodies are aligned, the finger base point and fingertip point markings from the centerline outward are offset by half a "unit" on the respective first and second bodies.

In a further embodiment, the equally spaced indicia of the first and second rigid bodies are located, respectively, along one of the first and second lateral edges of the respective rigid body.

In a second embodiment, the apparatus includes a single, elongate flat rigid body having indicia on both the top and bottom surfaces thereof. Thus, a rigid body having two operable surfaces with measurement indicia and centerline markings is provided. The rigid body includes two ends, first and second lateral edges extending between and connecting the ends, a top surface, and a bottom surface. The top surface may include a first set of equally spaced measurement indicia each of which corresponds, respectively, to a conveyor belt finger base point. The bottom surface may include a second set of equally spaced measurement indicia each of which corresponds, respectively, to a conveyor belt fingertip point. Both the top and bottom surfaces may further include indicia marking the centerline. In one aspect, the centerline marked on the top surface falls halfway between the finger base point markings, and the centerline on the bottom surface falls on a fingertip point marking.

In a third embodiment, a method for marking conveyor belt ends for bias angle splicing is provided herein and generally includes the steps of: (1) providing an apparatus for marking fingers on belt ends to be spliced including first and second flat, elongate rigid bodies having measurement indicia thereon, the top surface of the first rigid body marked with a centerline and equally spaced indicia, each of which corresponds, respectively, to a conveyor belt finger base point, and the top surface of the second rigid body marked with a centerline and equally spaced indicia, each of which corresponds, respectively, to a conveyor belt fingertip point; (2) marking a centerline on the belt ends to be spliced; (3) marking a square reference line on the belt ends to be spliced; (4) marking a bias angle on the belts ends to be spliced; (5) marking finger base points and fingertip points on the belt ends to be spliced using the apparatus for marking the fingers on the belt ends to be spliced; and (6) drawing belt end fingers on the belt ends to be spliced by connecting the marked finger base points and fingertip points.

DETAILED DESCRIPTION OF THE INVENTION

The present invention will now be described more fully hereinafter with reference to exemplary embodiments and the accompanying drawings in which exemplary embodiments of the invention are shown. It should be understood, however, that the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

The apparatus and methods disclosed herein facilitate conveyor belt splicing, and in particular, bias angle multi-finger splicing of belt ends. As used herein, "bias angle" means deviating from square across the width of the belt, "square" meaning 90° perpendicular to the edge of the belt, across the width. In a specific embodiment, the angle may be 22° from square, although other angles are envisioned. As used herein, "centerline" means a line drawn along the middle of the belt (parallel to belt travel) used to align one belt end with another to ensure the splice will operate true and straight. As used herein, "finger gap" means the necessary space between a finger from one belt end and a finger from the other belt end allowing space for uncured rubber. In a specific embodiment, the finger gap may range between 1/16" to 1/8". Too large or too small of gaps can negatively affect the strength of the splice and lead to splice failure. Finger length may vary based on the tension rating of the belt. Finger length may range, for example, from 22" to 63" measured from finger base to fingertip.

The term "measurement indicia" as used herein means units of measurement along a lateral edge of the apparatus for marking finger base points and fingertip points for drawings splice fingers. Measurement indicia may include equally spaced units. The apparatus may include one or more sets of equally spaced units corresponding to different belt widths. For example, for a 24" belt width, units may be equally spaced in 2" increments for a square splice, while bias angle increments may be equally spaced in 2 3/16" increments.

Figure 1:
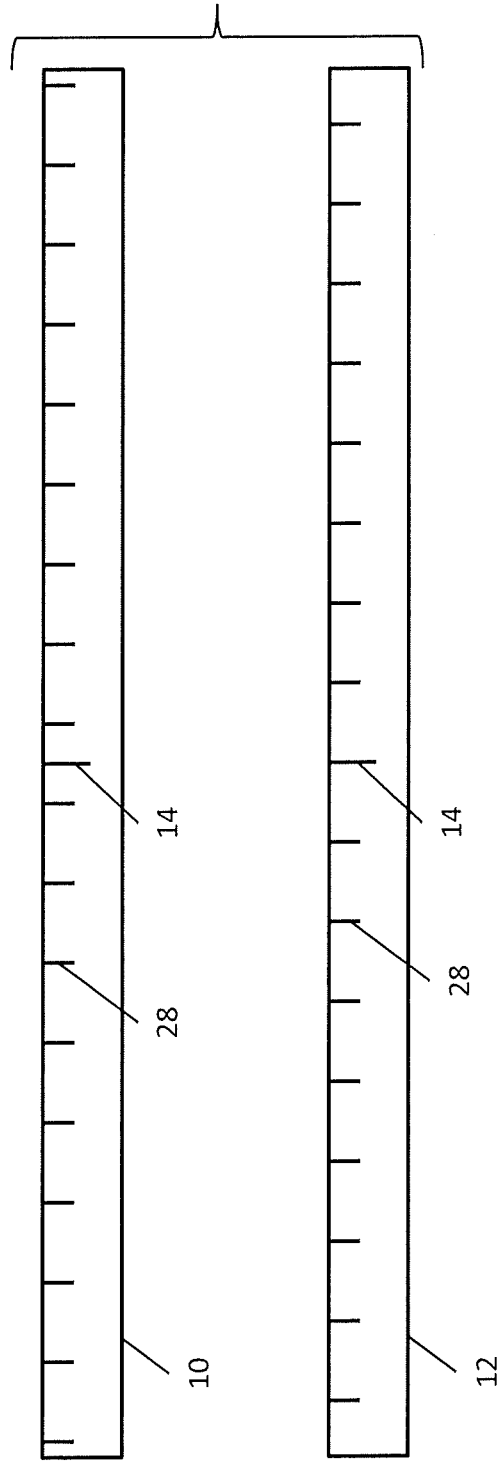
FIG. 1 schematically illustrates a first embodiment of an apparatus for marking conveyor belt ends for bias angle finger splicing.

Referring to FIG. 1, a first apparatus for marking conveyor belt ends for bias angle splicing generally includes a first flat, elongate rigid body 10 marked with relevant measurement indicia 28 for splicing, and a second flat, elongate rigid body 12 marked with relevant measurement indicia 28 for splicing. Each of the first and second rigid bodies generally take the form of a ruler including two ends, first and second lateral edges extending between and connecting the ends, a bottom surface, and a top surface marked with the measurement indicia 28. The top surface of the first rigid body 10 is marked with equally spaced measurement indicia 28, each of which corresponds, respectively, to a conveyor belt finger base point. The top surface of the second rigid body 12 is marked with equally spaced measurement indicia 28, each of which corresponds, respectively, to a conveyor belt fingertip point.

In one aspect, the indicia includes equally spaced markings from a centerline marking 14 outward. The centerline marking 14 is used to align the apparatus with respect to a centerline marked along the middle of the belt parallel to belt travel. The measurement indicia on the first and second bodies is "offset" by half of a spacing measurement taken from the centerline mark of each of the respective bodies outward, thereby differentiating the first rigid body from the second rigid body. In other words, the centerline marking 14 on the first body 10 for marking the finger base points on one of the belt ends falls halfway between one unit of measurement, while the centerline marking 14 on the second rigid body 12 for marking the fingertip points on that same belt end falls on a measurement marking.

The equally spaced indicia 28 on the first and second rigid bodies 10, 12 are located, respectively, along one of the first and second lateral edges of the respective rigid body.

In a second embodiment, the apparatus includes a single, elongate flat rigid body having indicia on both the top and bottom surfaces thereof. Again, the rigid body includes two ends, first and second lateral edges extending between and connecting the ends, a top surface, and a bottom surface. The top surface includes a centerline marking 14 and a first set of equally spaced measurement indicia each of which corresponds, respectively, to a conveyor belt finger base point. The bottom surface includes a centerline marking 14 and a second set of equally spaced measurement indicia each of which corresponds, respectively, to a conveyor belt fingertip point.

Figure 2:
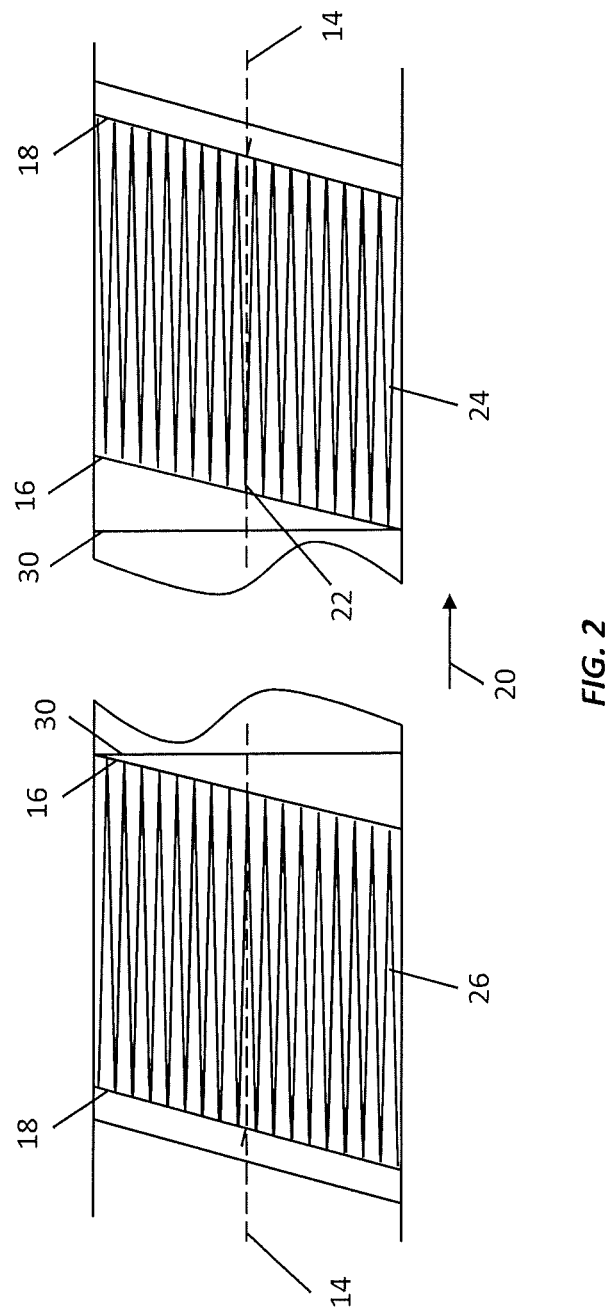
FIG. 2 schematically illustrates conveyor belt ends to be spliced that have been finger marked using the apparatus of FIG. 1.

Referring to FIG. 2, one or more of the first and second embodiments of the apparatus described above facilitate belt marking in bias finger vulcanized splicing. Finger splicing procedure according to the present invention utilizing the apparatus described herein generally includes: (1) laying out the belt ends to be spliced with the top cover facing up; (2) marking the centerline on both top covers; (3) creating a square reference line on each belt; (4) finding and marking the bias angle; (5) marking belt end 1 finger base points and belt end 1 fingertip points; (6) drawing belt end 1 fingers; (7)

marking belt end 2 finger base points and belt end 2 fingertip points; (8) drawing belt end 2 fingers; (9) cutting along the finger lines; (10) removing the cut material; (11) fitting the belts with the centerlines aligned; (12) bonding the components together; and (13) allowing time to cure.

Steps (1) and (9)-(13) are conventional, and thus are not discussed in detail herein.

Regarding step (2) above, the centerline is marked on the top cover of each belt end to be spliced. This may be accomplished by marking the mid-point of the belt at several locations along the belt and drawing a straight line through the marks. The length of the centerlines should be 3-4 times the belt width and should be clearly visible on the top surface. Proper centerline alignment ensures a straight splice and belt tracking.

Regarding step (3) above, the reference line 30 is drawn across the width of the belt 90° to the centerline. The reference line 30 should be determined from the centerline and not the belt edge.

Regarding step (4) above, the bias angle may be determined based on belt width. Typically, the bias length is the belt width×0.4, resulting in a 22° bias angle. Left-hand and right-hand lead bias angles are shown marked on the opposing belt ends in FIG. 2.

The apparatus embodiments described above are particularly suited for procedure steps (5)-(8) above for marking the finger base points and fingertip points and drawing the fingers. Referring to belt end 1 shown on the left-hand side of FIG. 2, rigid body 10 is used to mark the fingertip points along bias fingertip line 16 proximate the torn end. With the rigid body 10 aligned along fingertip line 16 and with the centerline marking 14 aligned with the centerline marked on the belt, each fingertip point is marked on the belt outward from the centerline using the measurement indicia on rigid body 10. Rigid body 12 is used to mark the finger base points along finger base line 18 on the belt distal from the torn end. With the fingertip points and finger base points marked on the belt surface, the straight edge of either apparatus 10 or 12 may be used to connect the points to draw the fingers in the pattern shown in FIG. 2. It should be noted that FIG. 2 is not drawn to scale and that the number of fingers made for the splice may vary.

The fingers are drawn on belt end 2 shown on the right-hand side of FIG. 2 in a similar manner, with rigid body 12 being used to draw the fingertip points along fingertip line 16 and with rigid body 10 being used to draw the finger base points along finger base line 18, and a straight lateral edge of either rigid body 10 or 12 being used to connect the fingertip points and finger base points to draw the fingers in the pattern shown in FIG. 2.

The direction of travel of the belt is indicated by directional arrow 20. The direction of travel may dictate mapping the center finger 22 in the opposite direction of travel. Outer fingers 24 on the leading end of the conveyor belt face the opposite direction of travel, while inner fingers 26 on the trailing end of the belt face the direction of travel. In splice mapping, the center finger 22 on the leading belt end may be used as a point of reference. Generally, belts with widths that are divisible by 6" (152 mm) have a center finger 22 pointing in the opposite direction of belt travel.

The apparatus described above in the second embodiment may be used to mark the finger base point and fingertip points on the belt ends by flipping between the top and bottom surfaces of the rigid body as needed.

The embodiment including two separate rigid elongate bodies described above is preferred in order that two users may concurrently work on the two ends of the belt to be joined to speed the procedure and reduce downtime.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

What is claimed is:

1. An apparatus for marking conveyor belt ends to be bias angle finger spliced, comprising:
    a first elongate rigid body marked with indicia for finger splicing, the indicia including a centerline marking for alignment with a conveyor belt centerline and equally spaced measurement indicia marked outward from the centerline marking, the equally spaced measurement indicia corresponding, respectively, to conveyor belt finger base points; and
    a second elongate rigid body marked with indicia for finger splicing, the indicia including a centerline marking for alignment with the conveyor belt centerline and equally spaced measurement indicia marked outward from the centerline marking, the equally spaced measurement indicia corresponding, respectively, to conveyor belt fingertip points;
    wherein the equally spaced measurement indicia between the first and second rigid bodies is offset, respectively, by half of a spacing measurement from the centerline marking outward, thereby differentiating the first elongate rigid body from the second elongate rigid body.

2. The apparatus of claim 1, wherein each of the first and second elongate rigid bodies are flat and comprise two ends, first and second lateral edges extending between and connecting the two ends, a bottom surface, and a top surface marked with the indicia.

3. The apparatus of claim 1, wherein the centerline marking on the first elongate rigid body falls halfway between the finger base point markings on the first elongate rigid body.

4. The apparatus of claim 1, wherein the centerline marking on the second elongate rigid body falls on a fingertip point marking on the second elongate rigid body.

5. The apparatus of claim 1, wherein the first and second elongate rigid bodies have the same length such that the centerline markings align when the first and second elongate rigid bodies are aligned and the equally spaced measurement indicia are offset by half a measurement unit between the respective first and second elongate rigid bodies.

6. The apparatus of claim 1, wherein the distance between the equally spaced measurement indicia is 2 and $3/16$ inches.

7. The apparatus of claim 1, wherein the distance between the equally spaced measurement indicia is 2 inches.

8. An apparatus for marking conveyor belt ends to be bias angle finger spliced comprising an elongate rigid body having a top surface and a bottom surface, the top surface marked with indicia including a centerline marking for alignment with a conveyor belt centerline and equally spaced measurement indicia marked outward from the centerline marking, the equally spaced indicia corresponding, respectively, to conveyor belt finger base points, and the bottom surface marked with indicia including a centerline marking for alignment with the conveyor belt centerline and equally spaced measurement indicia marked outward from the centerline marking, the equally spaced indicia corresponding, respectively, to conveyor belt fingertip points, wherein the equally spaced measurement indicia marked on the top and bottom surfaces is offset, respectively, by half of a spacing measurement from the centerline markings outward, thereby differentiating the measurement indicia on the top surface from the bottom surface.

9. The apparatus of claim 8, wherein elongate rigid body is flat and comprise two ends, first and second lateral edges extending between and connecting the two ends, and the top and bottom surfaces.

10. The apparatus of claim 8, wherein the centerline marking on the top surface falls halfway between the finger base point markings on the top surface.

11. The apparatus of claim 8, wherein the centerline marking on the bottom surface falls on a fingertip point marking on the bottom surface.

12. The apparatus of claim 8, wherein the distance between the equally spaced measurement indicia is 2 and $3/16$ inches.

13. The apparatus of claim 8, wherein the distance between the equally spaced measurement indicia is 2 inches.

14. A method for marking conveyor belt ends for bias angle splicing, comprising the steps of:

(a) providing an apparatus for marking fingers on belt ends to be spliced including first and second flat, elongate rigid bodies having measurement indicia thereon, the top surface of the first rigid body marked with a centerline marking and equally spaced measurement indicia, each of which corresponds, respectively, to a conveyor belt finger base point, and the top surface of the second rigid body marked with a centerline marking and equally spaced measurement indicia, each of which corresponds, respectively, to a conveyor belt fingertip point;

(b) marking a centerline on the belt ends to be spliced;

(c) marking a square reference line on the belt ends to be spliced;

(d) marking a bias angle on the belts ends to be spliced;

(e) marking finger base points and fingertip points on the belt ends to be spliced using the apparatus of (a); and (f) drawing belt end fingers on the belt ends to be spliced by connecting the marked finger base points and fingertip points.

* * * * *